US012503012B2

(12) United States Patent
Han et al.

(10) Patent No.: US 12,503,012 B2
(45) Date of Patent: Dec. 23, 2025

(54) SYSTEM AND METHOD FOR CONTROLLING A SEAT FOR A VEHICLE

(71) Applicants: HYUNDAI MOTOR COMPANY, Seoul (KR); KIA CORPORATION, Seoul (KR); DAE WON SAN UP CO., LTD, Ansan-si (KR)

(72) Inventors: Kug Hun Han, Seoul (KR); Yo Han Kim, Ansan-si (KR); Dong Hoon Lee, Seoul (KR); Jang Sung Chun, Seongnam-si (KR); Dae Yong Jang, Incheon (KR); Si Hyung Song, Suwon-si (KR); Dong Jun Lee, Cheonan-si (KR); Han Jin Kim, Wonju-si (KR); Jae Myung Hur, Seoul (KR); Won Ho Chang, Cheonan-si (KR)

(73) Assignees: HYUNDAI MOTOR COMPANY, Seoul (KR); KIA CORPORATION, Seoul (KR); DAE WON SAN UP CO., LTD, Ansan-si (KR)

( * ) Notice: Subject to any disclaimer, the term of this patent is extended or adjusted under 35 U.S.C. 154(b) by 212 days.

(21) Appl. No.: 18/124,137

(22) Filed: Mar. 21, 2023

(65) Prior Publication Data

US 2024/0025305 A1 Jan. 25, 2024

(30) Foreign Application Priority Data

Jul. 25, 2022 (KR) .................. 10-2022-0091771

(51) Int. Cl.
*B60N 2/02* (2006.01)

(52) U.S. Cl.
CPC ....... *B60N 2/0277* (2023.08); *B60N 2/02246* (2023.08); *B60N 2/0272* (2023.08); *B60N 2205/30* (2013.01)

(58) Field of Classification Search
CPC .................. B60N 2/0277; B60N 2/02246
See application file for complete search history.

(56) References Cited

U.S. PATENT DOCUMENTS

| 6,677,720 B2 | 1/2004 | Fraser |
| 8,981,700 B2 | 3/2015 | Okada et al. |
| 9,975,453 B2 | 5/2018 | Lee et al. |
| 10,293,711 B2 | 5/2019 | Lee et al. |
| 10,840,837 B2 | 11/2020 | Lee et al. |
| 2013/0049669 A1 | 2/2013 | Han |

(Continued)

FOREIGN PATENT DOCUMENTS

| DE | 102021127232 A | * 4/2021 | ......... B60N 2/02246 |
| JP | 2014007848 A | 1/2014 | |

(Continued)

*Primary Examiner* — Anthony D Barfield
(74) *Attorney, Agent, or Firm* — Lempia Summerfield Katz LLC

(57) ABSTRACT

Disclosed are a system and method for controlling a seat for a vehicle. In particular, the system includes a seat positioned in a vehicle, a motor embedded in the seat and configured to adjust an operation of the seat, a Hall sensor configured to sense an operation of the motor, and a controller configured to measure a pulse width according to the operation of the motor by means of the Hall sensor and determine whether jamming occurs during the operation of the seat based on the measured pulse width.

13 Claims, 8 Drawing Sheets

(56) References Cited

U.S. PATENT DOCUMENTS

| | | |
|---|---|---|
| 2013/0154534 A1 | 6/2013 | Okada et al. |
| 2017/0174102 A1 | 6/2017 | Lee et al. |
| 2017/0327007 A1 | 11/2017 | Lee et al. |
| 2019/0123667 A1 | 4/2019 | Lee et al. |
| 2022/0123546 A1 | 4/2022 | Lee |
| 2022/0134909 A1 | 5/2022 | Han |

FOREIGN PATENT DOCUMENTS

| | | |
|---|---|---|
| JP | 5831201 B2 | 11/2015 |
| JP | 6939332 B2 | 9/2021 |
| KR | 101634881 B1 | 6/2016 |
| KR | 101683921 B1 | 12/2016 |
| KR | 20170074108 A | 6/2017 |
| KR | 101753999 B1 | 7/2017 |
| KR | 101818358 B1 | 2/2018 |
| KR | 102354709 B1 | 1/2022 |
| KR | 20220059290 A | 5/2022 |

\* cited by examiner

SYSTEM AND METHOD FOR CONTROLLING A SEAT FOR A VEHICLE

CROSS REFERENCE TO RELATED APPLICATION

The present application claims priority to Korean Patent Application No. 10-2022-0091771, filed on Jul. 25, 2022, the entire contents of which are incorporated herein for all purposes by this reference.

BACKGROUND

Field

The present disclosure relates to a system and method for controlling a seat for a vehicle.

Description of the Related Art

A seat for a vehicle serves to allow an occupant to be seated in a comfortable posture so that the occupant does not feel fatigue even when traveling a long distance. The seat broadly includes a seat cushion configured to support a load of an occupant and installed to be slidable forward or rearward on a floor surface in an interior and a seatback installed to be rotatable at a predetermined angle relative to the seat cushion and configured to support the occupant's back.

The seating space in the vehicle is required to accommodate people with various body sizes and luggage. Therefore, based on a preference of the occupant, the seat, an angle of the seatback of the seat, and a forward/rearward position of the seat cushion can be adjusted.

In the related art, a lever is provided on the seat and the occupant adjusts the seat by directly and manually manipulating the lever. Recently, for convenience for the occupant, a switch is provided on the seat, and the occupant may adjust the seat by manipulating the switch by using electric power. This is made possible by a motor provided in the seat and a control logic for controlling an operation of the motor that allows the occupant to adjust the seatback and the seat cushion by electric power.

However, during the process of adjusting the seat, jamming may occur because of an obstacle disposed between the seatback and the seat cushion or on a rail on which the seat moves. In addition, seat jamming may occur because of a passenger seated in a rear seat during the process of adjusting a driver seat or a passenger seat. Typically, a separate current sensor is provided to sense seat jamming caused by an obstacle or occupant during the process of adjusting the seat by using electric power. However, there are problems with such a solution in that the configuration in which the current sensor is used to sense the seat jamming requires high precision of the current sensor, and a separate element needs to be provided in addition to the current sensor to make the solution work.

The foregoing explained as the background is provided merely to aid in the understanding of the background of the present disclosure, and is not intended to mean that the present disclosure falls within the purview of the related art that is already known to those having ordinary skill in the art.

SUMMARY OF THE PRESENT DISCLOSURE

The present disclosure is proposed to solve these problems and aims to provide a system and method for controlling a seat for a vehicle, which measure a pulse width according to an operation of a motor by using a Hall sensor, and determine whether the jamming occurs when the seat operates based on the measured pulse width, thereby quickly detecting and coping with jamming.

To achieve the above-mentioned object, the present disclosure provides a system for controlling a seat for a vehicle. In particular, the system includes: a seat positioned in a vehicle; a motor embedded in the seat and configured to adjust an operation of the seat; a Hall sensor configured to sense an operation of the motor; and a controller configured to measure a pulse width according to the operation of the motor by means of the Hall sensor and determine whether jamming occurs during the operation of the seat based on the measured pulse width.

The controller may learn a time period as the pulse width, and the time period corresponds to a time between an ascending edge and a descending edge of a pulse generated by a rotation of the motor and measured by the Hall sensor.

The controller may learn the pulse width measured by the Hall sensor when the seat initially operates in an entire section, and the controller may compare the learned pulse width with the pulse width measured during the operation of the seat and determine whether the jamming occurs during the operation of the seat.

The controller may learn the pulse width under a normal condition, and the normal condition may be an application of voltage as a rated voltage, an operation in a room temperature and humidity state, or an operation in a no-load state.

The initial operation of the seat in the entire section may mean that the operation of the seat is performed once in the entire section in an operation range without the occurrence of jamming after the seat is produced and mounted in the vehicle.

The controller may store the learned pulse width of the Hall sensor in a memory.

The controller may calculate a change amount between the pulse width and an average value of the learned pulse widths, determine a jamming detection absolute value made by adopting the calculated change amount, compare the determined jamming detection absolute value with the pulse width measured during the operation of the seat, and determine whether the jamming occurs during the operation of the seat.

The controller may calculate the average value of the learned pulse widths by using a cumulative-mean calculation method.

The controller may detect a change in pulse width measured by the Hall sensor during the operation of the seat, and when the detected pulse width exceeds the jamming detection absolute value the reference number of times, the controller may determine that the jamming occurs.

To achieve the above-mentioned object, the present disclosure provides a method of controlling a seat for a vehicle, the method including: measuring, by a controller, a pulse width according to an operation of a seat motor by means of a Hall sensor; and determining, by the controller, whether jamming occurs during an operation of the seat based on the pulse width measured by the Hall sensor.

The method may further include learning, by the controller, the pulse width measured by the Hall sensor when the seat initially operates in an entire section before the measuring of the pulse width.

In the measuring of the pulse width, the controller may learn a time period as the pulse width, and the time period is a time between an ascending edge and a descending edge of a pulse generated by a rotation of the motor and measured by the Hall sensor.

In the determining of whether the jamming occurs, the controller may compare the learned pulse width with the pulse width measured during the operation of the seat and determine whether the jamming occurs during the operation of the seat.

In the determining of whether the jamming occurs, the controller may calculate a change amount between the pulse width and an average value of the learned pulse widths, determine a jamming detection absolute value made by adopting the calculated change amount, compare the determined jamming detection absolute value with the pulse width measured during the operation of the seat, and determine whether the jamming occurs during the operation of the seat.

In the determining of whether the jamming occurs, the controller may detect a change in pulse width measured by the Hall sensor during the operation of the seat, and when the detected pulse width exceeds the jamming detection absolute value the reference number of times, the controller may determine that the jamming occurs.

According to the system and method for controlling a seat for a vehicle according to the present disclosure, the controller learns the pulse width measured by the Hall sensor during the operation of the seat and compares the pulse width, which is generated for each time the seat operates, with the normal pulse width in which no jamming occurs, which makes it possible to quickly detect and cope with the jamming in case of the occurrence of jamming of the seat.

DETAILED DESCRIPTION

Figure 1:
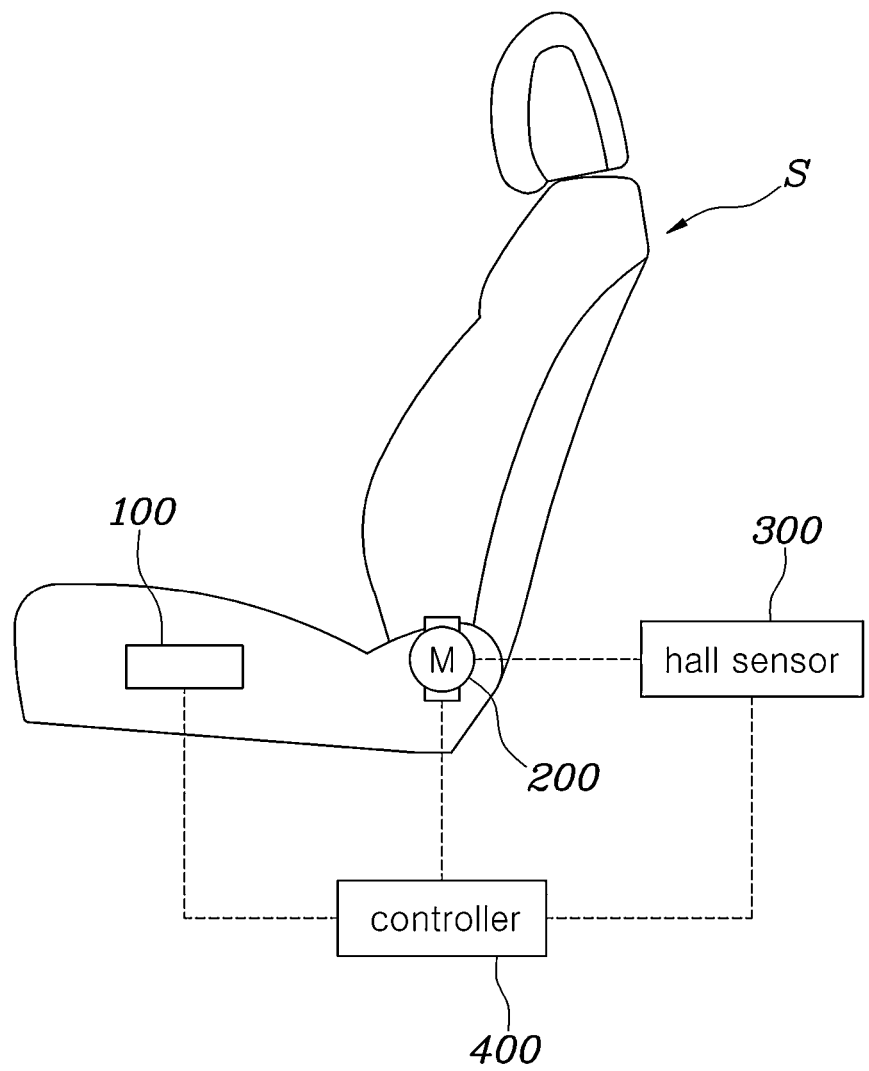
FIG. 1 is a configuration view of a system for controlling a seat for a vehicle according to an embodiment of the present disclosure.

In the description of embodiments disclosed in the present disclosure, the specific descriptions of publicly known related technologies are omitted when it is determined that the specific descriptions may obscure the subject matter of the embodiments disclosed in the present disclosure. In addition, it should be understood that the accompanying drawings are provided only to allow those having ordinary skill in the art to easily understand the embodiments disclosed in the present disclosure, and the technical spirit disclosed in the present disclosure is not limited by the accompanying drawings, and includes all alterations, equivalents, and alternatives that are included in the spirit and the technical scope of the present disclosure.

The terms including ordinal numbers such as "first," "second," and the like may be used to describe various constituent elements, but the constituent elements are not limited by the terms. These terms are used only to distinguish one constituent element from another constituent element.

When one constituent element is described as being "coupled" or "connected" to another constituent element, it should be understood that one constituent element can be coupled or connected directly to another constituent element, and an intervening constituent element can also be present between the constituent elements. When one constituent element is described as being "coupled directly to" or "connected directly to" another constituent element, it should be understood that no intervening constituent element is present between the constituent elements.

Singular expressions include plural expressions unless clearly described as different meanings in the context. When a component, device, element, or the like of the present disclosure is described as having a purpose or performing an operation, function, or the like, the component, device, or element should be considered herein as being "configured to" meet that purpose or to perform that operation or function.

In the present specification, it should be understood the terms "comprises," "comprising," "includes," "including," "containing," "has," "having" or other variations thereof are inclusive and therefore specify the presence of stated features, integers, steps, operations, elements, components, or combinations thereof, but do not preclude the presence or addition of one or more other features, integers, steps, operations, elements, components, or combinations thereof.

Hereinafter, embodiments disclosed in the present disclosure are described in detail with reference to the accompanying drawings. The same or similar constituent elements are assigned with the same reference numerals regardless of reference numerals, and the repetitive description thereof is omitted.

Figure 2:
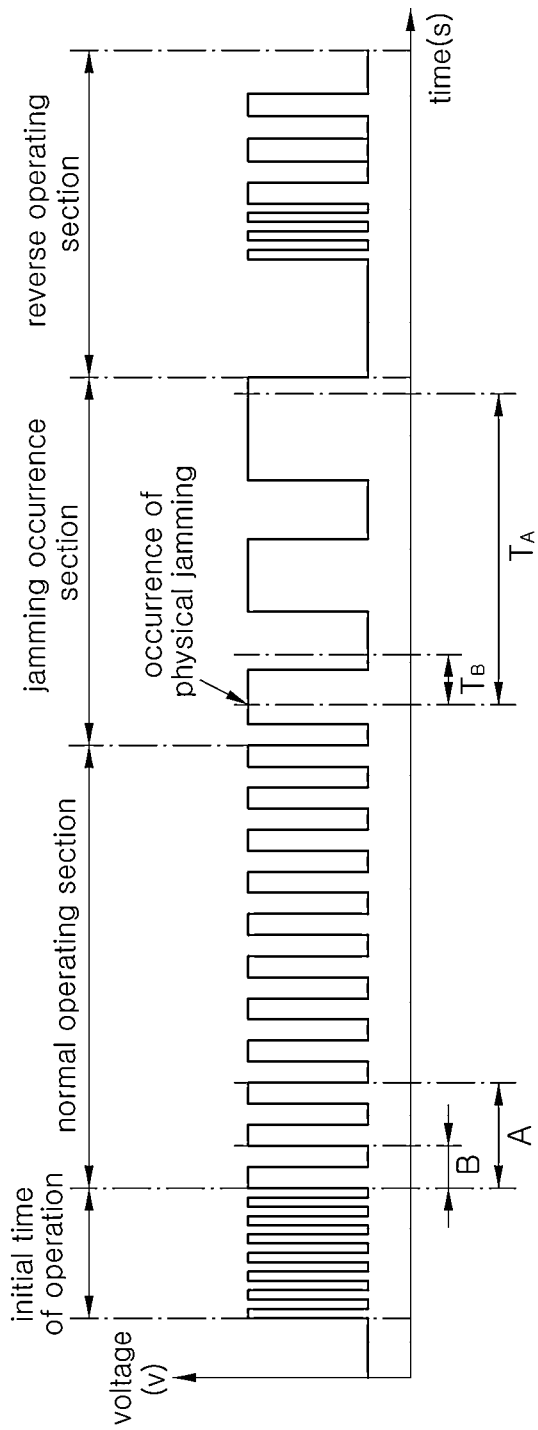
FIG. 2 is a graph illustrating pulse detection of a Hall sensor according to the embodiment of the present disclosure.
Figure 3:
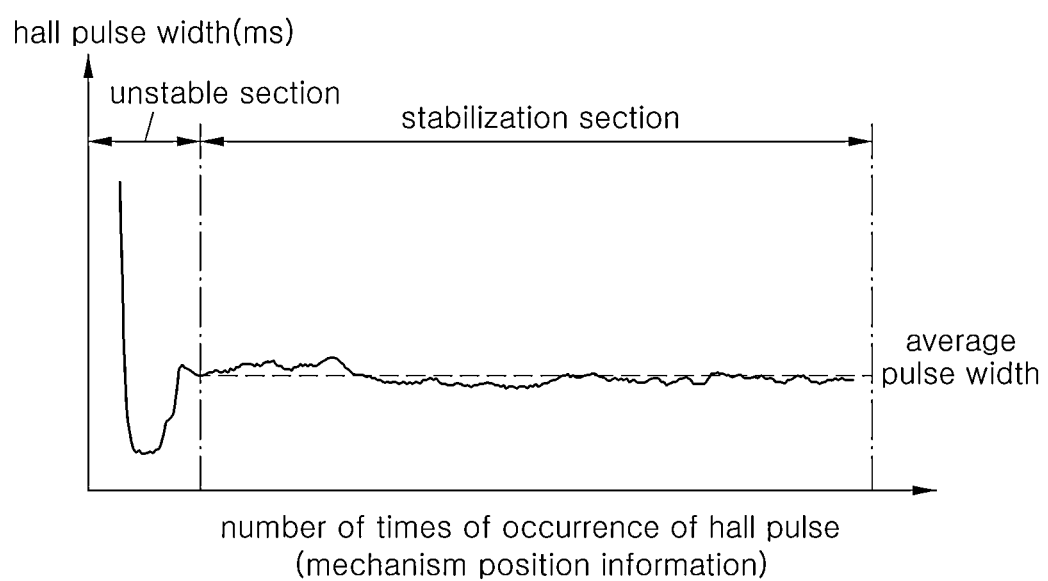
FIGS. 3 to 7 are graphs illustrating a process of detecting seat jamming according to an embodiment of the present disclosure.
Figure 6:
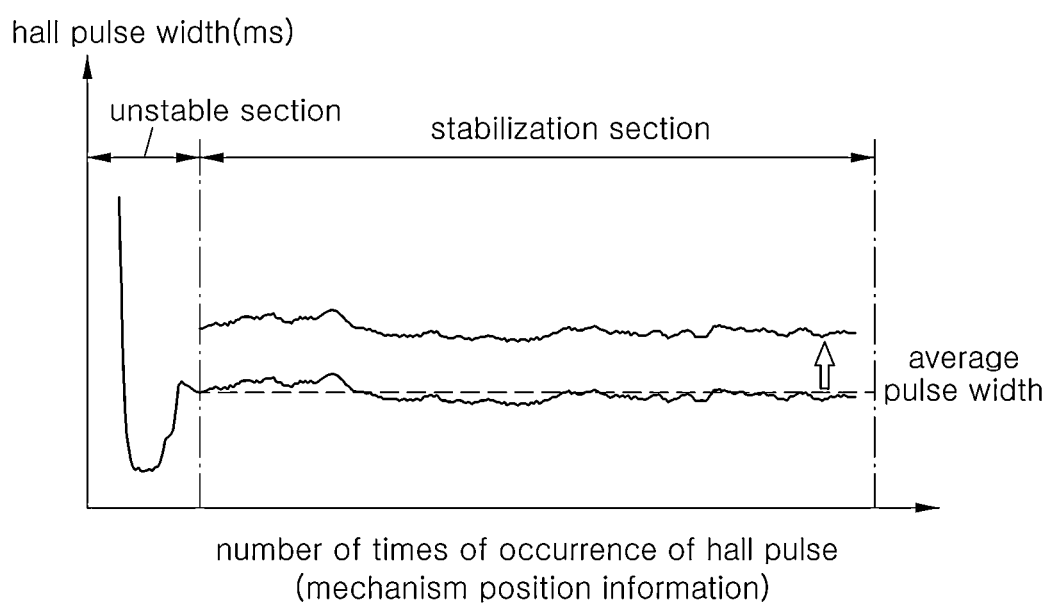
Figure 7:
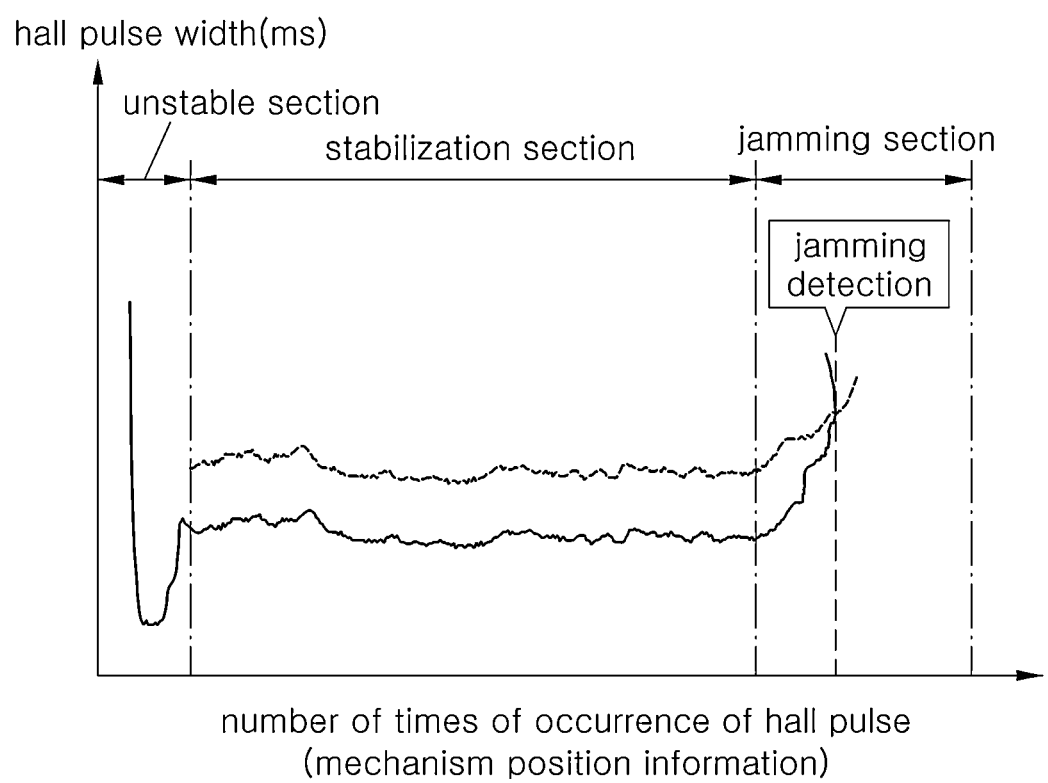
Figure 8:
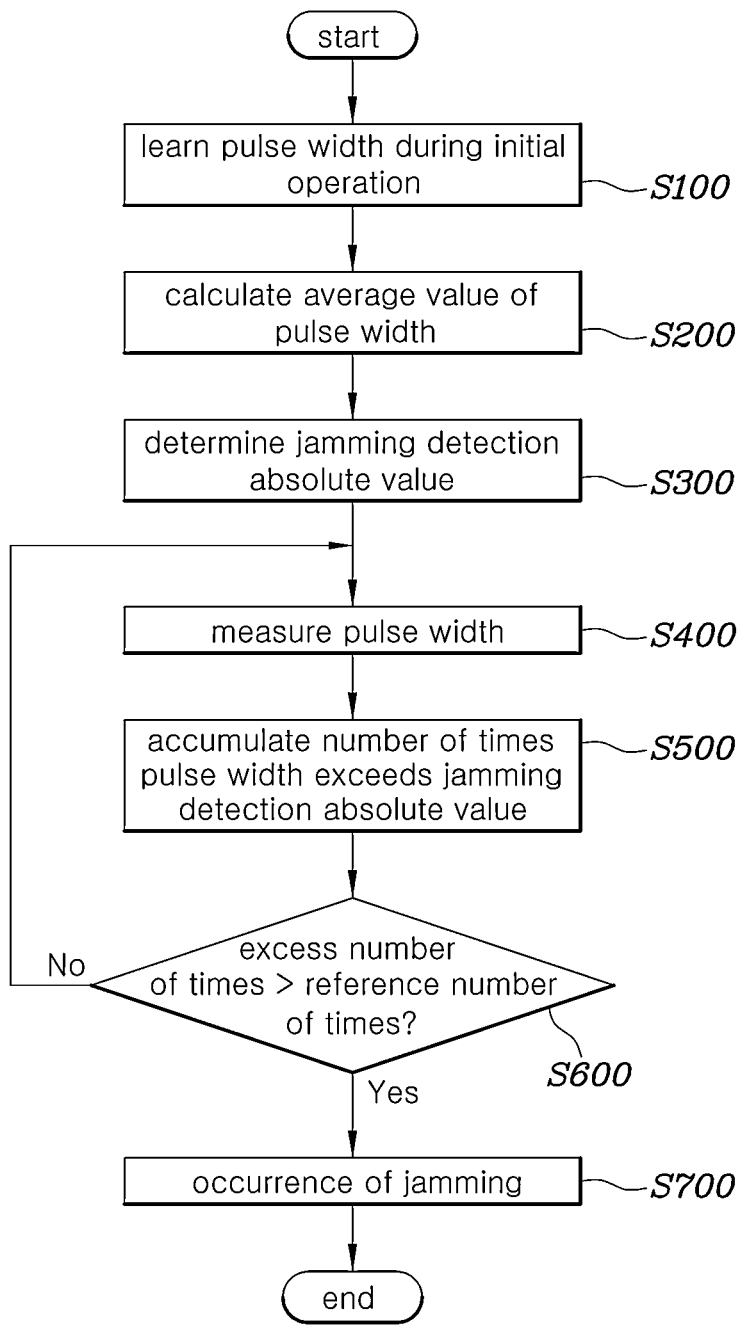
FIG. 8 is a flowchart illustrating a method of controlling a seat for a vehicle according to an embodiment of the present disclosure.

FIG. 1 is a configuration view of a system for controlling a seat for a vehicle according to an embodiment of the present disclosure, FIG. 2 is a graph illustrating pulse detection of a Hall sensor according to the embodiment of the present disclosure, FIGS. 3 to 7 are graphs illustrating a process of detecting seat jamming according to another embodiment of the present disclosure, and FIG. 8 is a flowchart illustrating a method of controlling a seat for a vehicle according to an embodiment of the present disclosure.

As illustrated in FIG. 1, the system for controlling a seat for a vehicle includes: a seat S positioned in a vehicle; a motor 200 embedded in the seat S and configured to adjust an operation of the seat S; a Hall sensor 300 configured to sense the operation of the motor 200; and a controller 400 configured to measure a pulse width according to the operation of the motor 200 by using the Hall sensor 300 and determine whether the jamming occurs when the seat S operates based on the measured pulse width.

The controller 400 according to an embodiment of the present disclosure may be implemented by a non-volatile memory (not illustrated) that is configured to store the algorithm for controlling operations of various constituent elements in a vehicle or store data related to software commands for executing the algorithm, and by a processor (not illustrated) configured to perform the following operations by using the data stored in the corresponding memory. The memory and the processor may be implemented as separate chips. Alternatively, the memory and the processor may be implemented as a single chip in which the memory and the processor are integrated. The processor may be configured in the form of one or more processors.

The seat S provided in the vehicle is configured to be adjustable based on a posture of an occupant by adjusting an angle of a seatback and adjusting a forward/rearward position of a seat cushion. Recently, for convenience for an occupant, a manipulation switch 100 is provided on the seat S, and the occupant can adjust the seat S by manipulating the manipulation switch 100, which uses electric power to adjust the seat. During the process of adjusting the seat S, jamming may occur because of an obstacle disposed between the seatback and the seat cushion or on a rail on which the seat S moves. In addition, jamming of the seat S may occur because of a passenger seated in a rear seat during the process of adjusting the seat S of a driver seat or a passenger seat. Therefore, a separate current sensor is provided to sense the jamming of the seat S caused by an obstacle or occupant during the process of adjusting the seat S by using electric power. However, there are problems with the mentioned solution in that the configuration in which the current sensor is used to sense the jamming of the seat requires high precision of the current sensor, and that a separate element needs to be additionally provided in addition to the current sensor.

Therefore, in the present disclosure, the Hall sensor 300 is used instead of the current sensor, making it possible to sense jamming of the seat S caused by an obstacle or occupant without adding a separate element. In particular, the present disclosure is intended to sense jamming of the seat S by detecting the pulse width of the motor 200 by using the Hall sensor 300. After the detection, the controller 400 learns from the Hall sensor 300 of the time period of the pulse width, which is the time between the ascending and descending edges of the pulse made by the rotation of the motor 200.

FIG. 2 is a graph illustrating pulse detection of the Hall sensor according to the embodiment of the present disclosure. The reason why the jamming of the seat S is sensed by using the pulse width in the embodiment is described with reference to FIG. 2. FIG. 2 is a pulse detection graph of the Hall sensor 300 over time. Methods of detecting the jamming include a method of detecting the number of pulses and a method of detecting the width of the pulse. Referring to FIG. 2, "A" means the number of pulses that is a criterion for detecting jamming and "B" means a pulse width that is a criterion for detecting jamming. Referring to the pulse detection graph of the Hall sensor 300, it can be ascertained that the pulse is regular in a normal operating section. It can also be ascertained that the interval of the pulse gradually increases in the jamming occurrence section. The method of detecting the number of pulses determines that the jamming has occurred if the number of pulses detected reaches a certain number to meet the criterion for concluding that a jamming event has taken place. Using this method, the controller 400 can identify that the jamming has occurred time of $T_A$ past the physical jamming.

Alternatively, the method of detecting the width of the pulse may determine the occurrence of jamming by only identifying the pulse width. When the method of detecting the width of the pulse is applied, the controller 400 recognizes that the jamming has occurred after time of $T_B$ passes after the occurrence of physical jamming. Simply put, in the method of detecting the width of the pulse, controller 400 detects the occurrence of jamming by measuring the length of the pulse width and using it as the criteria for identifying the jamming event. By utilizing the method of detecting the width of the pulse instead of number of pulses, it becomes possible to reduce the time taken for the controller 400 to determine the occurrence of jamming.

Meanwhile, the process of detecting the jamming of the seat S using the pulse width is described below in detail. First, the controller 400 learns the pulse width measured by the Hall sensor 300 when the seat S initially operates in the entire section. After learning of a correct value (i.e., a reference pulse width), the controller 400 compares the learned reference pulse width with a pulse width measured during the operation of the seat S, and determines whether the jamming occurs during the operation of the seat S. In other words, to determine whether the jamming occurs during the operation of the seat S, a reference value of a state in which no jamming is generated is required. Therefore, the controller 400 needs to learn the pulse width measured by the Hall sensor 300 when the seat S initially operates. The controller 400 may determine whether the jamming occurs during the operation of the seat S by comparing the reference value, which is measured or learned when no jamming occurs, with data (i.e., pulse width data) measured during the operation of the current motor 200.

The controller 400 may learn the pulse width under a normal condition. The normal condition may include conditions such as the application of voltage as a rated voltage, the operation in a room temperature and humidity state, or the operation in a no-load state. In addition, the initial operation of the seat S in the entire section means that the operation is performed once in the entire section in the operation range without the occurrence of jamming after the seat S is produced and mounted in a vehicle. The controller 400 needs to measure the pulse width by means of the Hall sensor 300 in a state in which no jamming occurs on the seat S. Simply put, the reference pulse width to be learned is data experimentally obtained after the seat S is mounted in the vehicle.

The data of the pulse width measured by the Hall sensor 300 may be expressed by a graph by changing the applied voltage, a temperature, or a load when the seat S operates. The pulse width measured by the Hall sensor 300 may be recorded in the form of a vibration graph as time passes, because a production error of the product or an operation error may affect the pulse width measured by the Hall sensor 300. Further, the graph may be in a form of an unstable graph in which a large amount of pinch occurs in the experimental condition, whereas the graph may be in a form of a stable graph. When jamming occurs during the operation of the seat S, the pulse width of the motor 200 may be recorded to be high at a point in time at which the jamming occurs. The controller 400 determines that the jamming occurs at a point at which the pulse width is recorded to be high. Therefore, to detect the jamming of the seat S based on the pulse width, the graph of the pulse width measured by the Hall sensor 300 needs to have a form of a stable graph. Therefore, it is necessary to specify a test condition in which the graph of the pulse width has the form of the stable graph, and the test condition is set as the normal condition. Further, the controller 400 stores the learned pulse width of the Hall sensor 300 in a memory. Because the learned pulse widths are stored in the memory, the controller 400 may obtain the pulse width data that are criteria for determining whether the jamming of the seat S occurs.

Thereafter, the controller 400 calculates a change amount between an average value of the learned pulse widths and the pulse widths, determines a jamming detection absolute value made by adopting the calculated change amount, compares the determined jamming detection absolute value with the pulse width measured during the operation of the seat S, and determines whether the jamming has occurred during the operation of the seat S.

FIGS. 3 to 7 are graphs illustrating a process of detecting seat jamming according to an embodiment of the present disclosure. Hereinafter, approach of detecting jamming of the seat S is described below in detail. The graphs in FIGS. 3 and 5 to 7 are graphs of the pulse width according to the number of times of the occurrence of pulse of the Hall sensor 300. The number of times of the occurrence of pulse of the Hall sensor 300 on the graph may indicate the position when the seat S moves in the section in the operation range. The number of times of the occurrence of pulse of the motor 200 in operation may be used to indirectly recognize the position of the seat S for adjusting the seat S by means of the manipulation switch 100. Therefore, the controller 400 may determine the position at which the jamming occurs in the operation range of the seat S by measuring the pulse width according to the number of times of the occurrence of pulse.

In addition, the controller 400 uses the pulse width value only in the stabilization section except for the unstable section. In case that the seat S is adjusted by the manipulation of the manipulation switch 100, the pulse width by the operation of the motor 200 may be stably measured. However, the pulse width may be unstably measured by an unstable initial operation of the motor 200. The use of the unstably measured pulse width may cause an error during the process of performed subsequent processes. Therefore, the controller 400 learns only the stabilization section, ignoring the unstable section, at the time of measuring the pulse width made by the operation of the motor 200.

Figure 4:
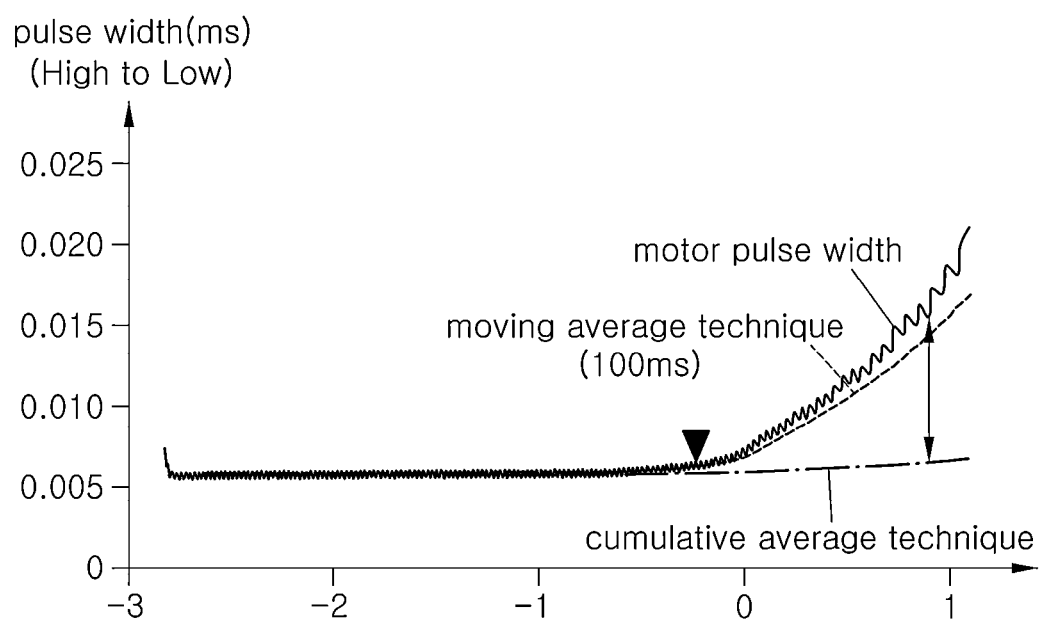

Further, the controller 400 calculates the average value of the learned pulse widths. In this case, the controller 400 may calculate the average value of the learned pulse width by a cumulative average calculation method. FIG. 4 is a graph illustrating a difference between the average value calculation methods of the pulse width according to the embodiment of the present disclosure. The methods of calculating the average value of the pulse width include a moving average calculation method and a cumulative average calculation method. The moving average calculation method determines a unit time, which is a criterion, and calculates the average value of the pulse width measured for the unit time. Further, the method sets the time interval and updates the average value at a period of the preset time interval. The moving average calculation method has problem that generates a great error because the previously measured pulse width is excluded for each time the average value of the pulse width measured for the unit time is updated for a period of the time interval. Therefore, the present disclosure selects the cumulative average calculation method to reduce an error at the time of calculating the average value of the pulse widths. The cumulative average calculation method calculates an average including all the previously measured pulse widths, which makes it possible to reduce an error that may occur in comparison with the moving average calculation method.

In addition, referring to FIG. 4, the pulse width graph according to the moving average calculation method has a difference from the pulse width graph of the motor 200, such that the graph shape having the same tendency is implemented. The time for detection of the jamming seat S during the occurrence of jamming increases as the interval between the pulse width graph of the motor 200 and the graph of the moving average calculation method increases. However, it can be ascertained that the pulse width graph according to the cumulative average calculation method is constantly maintained, unlike the pulse width graph of the motor 200. The jamming may be quickly detected in case of the occurrence of jamming of the seat S as the interval between the graph of the cumulative average calculation method and the pulse width graph of the motor 200 is large. That is, it is possible to reduce the time taken to determine the jamming of the seat S after the occurrence of jamming of the seat S by using the cumulative average calculation method.

Figure 5:
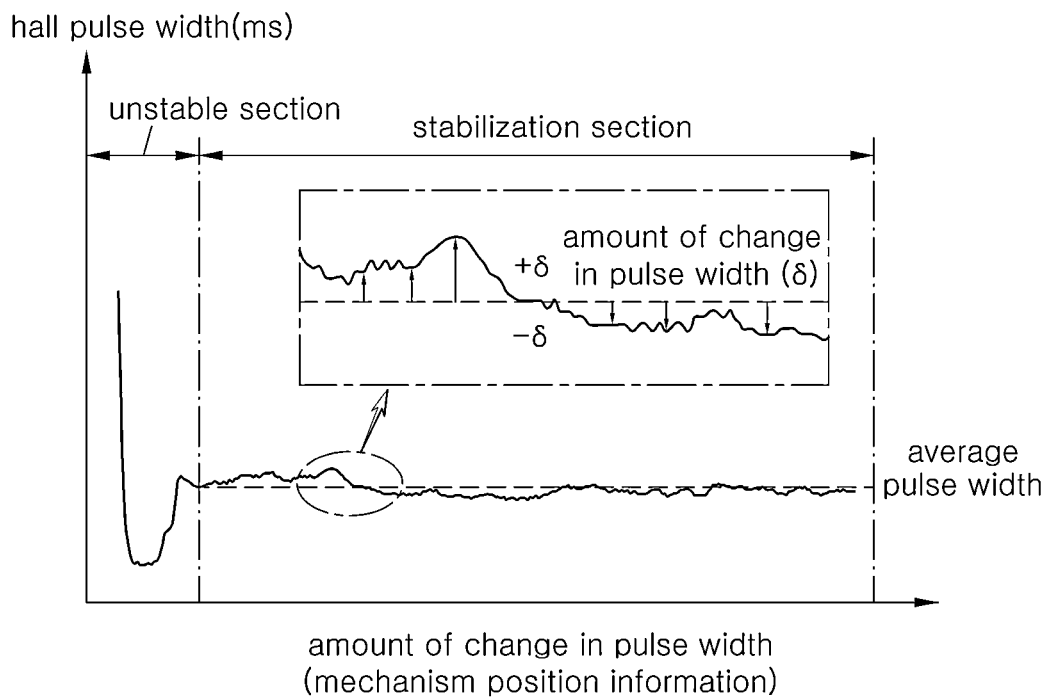

Thereafter, the controller 400 calculates the change amount between the pulse width and the average value of the learned pulse width. Referring to FIG. 5, it can be ascertained that the learned pulse width has a difference from the average value of the calculated pulse width. The controller 400 calculates the change amount based on the difference between the average value and the pulse width corresponding to the particular number of times of the occurrence of pulse of the Hall sensor 300. The calculated change amount may have a negative value or a positive value depending on the learned pulse width.

Further, the controller 400 determines a jamming detection absolute value made by adopting the calculated change amount. The learned pulse width is a value measured during the initial operation of the entire section in a normal state of the seat S. The pulse width measured during the actual operation of the seat S may be different from the learned pulse width. To determine the jamming of the seat S based on the average value of the pulse widths, there is a problem in that the average value is increased by the increase in the pulse width during the operation of the motor 200, and the criterion for detecting the jamming is raised, such that the controller 400 cannot clearly detect the jamming. To prevent the problem, the present disclosure determines the jamming detection absolute value. During the actual operation of the seat S, the learned pulse width data are entirely increased to prevent an error related to the jamming of the seat S due to the increase in pulse width of the motor 200. The jamming detection absolute value is a kind of a pulse width and determined by Equation 1 below.

$$\text{Jamming detection absolute value} = \{(\text{average pulse width} + \delta) * K\} \quad \text{[Equation 1]}$$

Here, δ represents the change amount, and K represents a correction constant. The controller 400 may calculate the change amount according to the number of times of the occurrence of pulse and determines the jamming detection absolute value in accordance with the number of times of the occurrence of pulse by adopting the calculated change amount. That is, the jamming detection absolute value may be a value calculated based on the change amount between the pulse width and the average value of the pulse width for each position of the seat under the normal condition. Referring to FIG. 6, it can be ascertained that the graph of the learned pulse width is increased in accordance with the determined jamming detection absolute value. Therefore, the controller 400 corrects the previously learned pulse width data, thereby preventing the error caused by the increase in pulse width of the motor 200 during the operation of the seat S and assuredly detecting the occurrence of jamming of the seat S.

Thereafter, the controller 400 detects a change in pulse width measured by the Hall sensor 300 during the operation of the seat S and determines that the jamming occurs when the detected pulse width exceeds the jamming detection absolute value the reference number of times or more. Referring to FIG. 7, the occurrence of jamming of the seat S may be detected by using the jamming detection absolute value and the graph of the pulse width measured by the Hall sensor 300 during the operation of the seat S. The solid line in FIG. 7 indicates the jamming detection absolute value graph stored in the controller, and the dotted line is a pulse width change graph of the motor 200 made by the operation of the seat S. When the jamming occurs during the operation of the seat S, the pulse width measured by the Hall sensor 300 is increased, and there occurs a section in which the increased pulse width exceeds the jamming detection absolute value. When the pulse width detected during the operation of the seat S exceeds the jamming detection absolute value, the controller 400 determines that the jamming occurs on the seat S. When the jamming occurs on the seat S, the controller 400 copes with the occurrence of jamming by stopping the operation of the motor 200 or switching the operation direction of the motor 200.

Meanwhile, there are several methods of designating the number of times the pulse width detected during the operation of the seat S exceeds the jamming detection absolute value. When the jamming is determined in case that the pulse width detected by the controller 400 during the operation of the seat S exceeds the jamming detection absolute value once, the jamming is detected only when the measured pulse width of the motor 200 has the data exceeding the jamming detection absolute value. The motor 200 may be affected by internal and external factors such as an increase in temperature or an application of load. The influence of the internal and external factors may increase the pulse width of the motor 200. When the controller 400 sensitively copes with the jamming, the jamming of the seat S may be immediately detected even based on a small change in pulse width. However, there is a problem in that a change in pulse width caused by factors other than the jamming of the seat S. However, in case that an excess reference number of times used to determine the jamming of the seat S is set to be large, there occurs a problem in that the controller 400 cannot quickly cope with the jamming even though the jamming actually occurs. Therefore, in one embodiment of the present disclosure, the reference number of times is set to three. In case that the detected pulse width exceeds the jamming detection absolute value three times or more during the operation of the seat S, the controller 400 determines that the jamming occurs on the seat S. In the present disclosure, the reference number of times used to determine the number of times the detected pulse width exceeds the jamming detection absolute value during the operation of the seat S is designated, which makes it possible to reduce a detection error that may be caused by factors other than the jamming.

Meanwhile, FIG. 8 is a flowchart of a method of controlling a seat for a vehicle according to the embodiment of the present disclosure. The method of controlling a seat for a vehicle according to the present disclosure includes: a step (S400) of measuring, by the controller 400, a pulse width according to the operation of the seat motor 200 by means of the Hall sensor 300; and steps S600 and S700 of determining, by the controller 400, whether the jamming occurs during the operation of the seat S based on the pulse width measured by the Hall sensor 300.

In the step (S400) of measuring the pulse width, the controller 400 learns the time period as the pulse width, and the time period is defined by the ascending edge and the descending edge of the pulse generated by the rotation of the motor 200 and measured by the Hall sensor 300. The current sensor is provided, and the method of detecting the jamming of the seat S in the related art is intended to detect the jamming of the seat S by identifying a change in value measured by the current sensor. In the present disclosure, the Hall sensor 300 is used. In particular, the Hall sensor 300 is used to measure the pulse width of the motor 200 to detect the jamming of the seat S.

Specifically, the method further includes a step (S100) of learning, by the controller 400, the pulse width measured by the Hall sensor 300 when the seat S initially operates in the entire section before the step (S400) of measuring the pulse width. To determine whether the jamming of the seat S occurs, the controller 400 needs to learn the reference pulse width of the motor 200 measured by the Hall sensor 300 when the seat S initially operates under the normal condition. Therefore, the controller 400 needs to learn in advance the pulse width experimentally measured when the seat S initially operates in the entire section, and the controller 400 needs to store the reference pulse width in the memory.

Furthermore, the controller 400 calculates the average value of the pulse widths by using the learned pulse widths (S200). In this case, the controller 400 calculates the average value of the pulse width by using the cumulative average calculation method. The controller 400 calculates the change amount between the pulse width and the calculated average value and determines the jamming detection absolute value made by adopting the calculated change amount (S300). At the time of determining whether the jamming of the seat S occurs by using the pulse width, the controller 400 determines that the jamming occurs when the pulse width is at a predetermined level or higher. However, the pulse width may be suddenly increased by factors, as well as the occurrence of jamming, which directly affect the motor 200. In this case, there may occur problems in that the criterion for detecting jamming is raised, and the jamming is not detected. To solve such problems, the controller 400 needs to determine the jamming detection absolute value and entirely increase the learned pulse width. Thereafter, when the jamming detection absolute value is determined, the controller 400 stores the jamming detection absolute value in the memory.

Thereafter, in the steps (S600 and S700) of determining whether the jamming occurs, the controller 400 compares the learned pulse width with the pulse width measured during the operation of the seat S, and determines whether the jamming occurs during the operation of the seat S. The controller 400 needs to adjust the learned pulse width to compare the pulse width learned prior to the determination of whether the jamming occurred and the pulse width measured during the operation of the seat S.

In the steps (S600 and S700) of determining whether the jamming occurs, the controller 400 detects a change in pulse width measured by the Hall sensor 300 during the operation of the seat S and determines that the jamming occurs when the detected pulse width exceeds the jamming detection absolute value the reference number of times or more. The controller 400 measures the pulse width by means of the Hall sensor 300 during the operation of the seat S (S400). Furthermore, the controller 400 compares the measured pulse width and the jamming detection absolute value and accumulates the number of times the measured pulse width exceeds the jamming detection absolute value (S500). The controller 400 identifies whether the accumulated number of times is more than the preset reference number of times (S600). When the accumulated number of times is the preset reference number of times or greater, the controller 400 determines that the jamming occurred on the seat S (S700). When the jamming occurs on the seat S, the controller 400 copes with the occurrence of jamming by stopping the operation of the motor 200 or switching the operation direction of the motor 200. However, when the accumulated number of times is not the preset reference number of times or greater, the controller 400 determines that no jamming occurred on the seat S. Thereafter, the controller 400 goes on to repeatedly performs the step of determining whether the jamming occurs during the operation of the seat S.

According to the system and method for controlling a seat for a vehicle according to the present disclosure, the controller learns the pulse width measured by the Hall sensor during the operation of the seat. The controller then compares the pulse width, which is generated for each time the seat operates, with the pulse width learned in the normal section in which no jamming occurs, which makes it possible to quickly detect and cope with the jamming in case of the occurrence of jamming of the seat.

While the specific embodiments of the present disclosure have been illustrated and described, it should be obvious to those having ordinary skill in the art that the present disclosure may be variously modified and changed without departing from the technical spirit of the present disclosure.

What is claimed is:

1. A system for controlling a seat for a vehicle, the system comprising:
   a seat positioned in a vehicle;
   a motor embedded in the seat and configured to adjust an operation of the seat;
   a Hall sensor configured to sense an operation of the motor; and
   a controller configured to measure a pulse width generated during an operation of the motor by means of the Hall sensor and determine whether jamming occurs during the operation of the seat based on the measured pulse width,
   wherein the controller is configured to learn a time period as the pulse width, and wherein the time period is a time between an ascending edge and a descending edge of a pulse made by a rotation of the motor and measured by the Hall sensor.

2. The system of claim 1, wherein the controller is configured to learn the pulse width measured by the Hall sensor when the seat initially operates in an entire section, and
   wherein the controller is configured to compare the learned pulse width with the pulse width measured during the operation of the seat and determines whether the jamming occurs during the operation of the seat.

3. The system of claim 2, wherein the controller is configured to learn the pulse width under a normal condition, and the normal condition is an application of voltage as a rated voltage, an operation in a room temperature and humidity state, or an operation in a no-load state.

4. The system of claim 2, wherein the initial operation of the seat in the entire section means that the operation of the seat is performed once in the entire section in an operation range without the occurrence of jamming after the seat is produced and mounted in the vehicle.

5. The system of claim 2, wherein the controller is configured to store the learned pulse width of the Hall sensor in a memory.

6. The system of claim 2, wherein the controller is configured to:
   calculate a change amount between the pulse width and an average value of the learned pulse widths,
   determine a jamming detection absolute value made by adopting the calculated change amount,
   compare the determined jamming detection absolute value with the pulse width measured during the operation of the seat, and
   determine whether the jamming occurs during the operation of the seat.

7. The system of claim 6, wherein the controller is configured to calculate the average value of the learned pulse widths by using a cumulative-mean calculation method.

8. The system of claim 6, wherein the controller is configured to detect a change in pulse width measured by the Hall sensor during the operation of the seat, and
   wherein when the detected pulse width exceeds the jamming detection absolute value a reference number of times, the controller determines that the jamming occurs.

9. A method of controlling a seat for a vehicle, the method comprising:
   measuring, by a controller, a pulse width according to an operation of a seat motor by a Hall sensor; and
   determining, by the controller, whether jamming occurs during an operation of the seat based on the pulse width measured by the Hall sensor,
   wherein in measuring the pulse width, the controller learns a time period as the pulse width, and the time period corresponds to a time between an ascending edge and a descending edge of a pulse generated by a rotation of the motor and measured by the Hall sensor.

10. The method of claim 9, further comprising:
    learning, by the controller, the pulse width measured by the Hall sensor when the seat initially operates in an entire section before the measuring of the pulse width.

11. The method of claim 9, wherein in determining whether the jamming occurs, the controller compares the learned pulse width with the pulse width measured during the operation of the seat and determines whether the jamming occurs during the operation of the seat.

12. The method of claim 11, wherein in determining whether the jamming occurs, the controller calculates a change amount between the pulse width and an average value of the learned pulse widths, determines a jamming detection absolute value made by adopting the calculated change amount, compares the determined jamming detection absolute value with the pulse width measured during the operation of the seat, and determines whether the jamming occurs during the operation of the seat.

13. The method of claim 11, wherein in determining whether the jamming occurs, the controller detects a change in pulse width measured by the Hall sensor during the operation of the seat, and
    wherein when the detected pulse width exceeds the jamming detection absolute value a reference number of times, the controller determines that the jamming occurs.

* * * * *